United States Patent
Takahashi et al.

(10) Patent No.: US 10,369,868 B2
(45) Date of Patent: Aug. 6, 2019

(54) PLATE-LIKE BODY WITH A RESIN FRAME ATTACHED THERETO FOR A VEHICLE

(71) Applicant: AGC Inc., Chiyoda-ku (JP)

(72) Inventors: Kazuhiro Takahashi, Chiyoda-ku (JP); Kunihiko Kawashima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/799,127

(22) Filed: Oct. 31, 2017

(65) Prior Publication Data
US 2018/0134125 A1    May 17, 2018

(30) Foreign Application Priority Data

Nov. 17, 2016   (JP) ................. 2016-224118

(51) Int. Cl.
| | | |
|---|---|---|
| *B60J 1/00* | (2006.01) | |
| *B60J 1/10* | (2006.01) | |
| *B60J 10/70* | (2016.01) | |
| *B32B 37/12* | (2006.01) | |
| *B32B 37/14* | (2006.01) | |

(52) U.S. Cl.
CPC ............ *B60J 1/007* (2013.01); *B32B 37/1284* (2013.01); *B60J 1/10* (2013.01); *B60J 10/70* (2016.02); *B32B 37/142* (2013.01)

(58) Field of Classification Search
CPC .... B60J 10/70; B60J 1/10; B60J 1/007; B32B 37/142; B32B 37/1284
See application file for complete search history.

(56) References Cited

U.S. PATENT DOCUMENTS

| | | | |
|---|---|---|---|
| 6,134,851 A | 10/2000 | Roze et al. | |
| 7,210,729 B2 * | 5/2007 | Hammaker | B60J 10/72 |
| | | | 296/146.15 |
| 8,312,689 B2 * | 11/2012 | Terazawa | B60J 10/78 |
| | | | 296/146.15 |
| 9,114,694 B2 * | 8/2015 | Sasaki | B60J 10/70 |
| 2003/0006623 A1 * | 1/2003 | Cornils | B60J 1/02 |
| | | | 296/93 |
| 2015/0017368 A1 * | 1/2015 | Kondou | B29C 45/14434 |
| | | | 428/38 |
| 2015/0061313 A1 * | 3/2015 | Watou | B29C 45/0003 |
| | | | 296/93 |

(Continued)

FOREIGN PATENT DOCUMENTS

| | | |
|---|---|---|
| CN | 2478825 Y | 2/2002 |
| JP | 5-213057 | 8/1993 |
| JP | 7-40381 A | 2/1995 |

*Primary Examiner* — Gregory A Blankenship
(74) *Attorney, Agent, or Firm* — Oblon, McClelland, Maier & Neustadt, L.L.P.

(57) ABSTRACT

A plate-like body with a resin frame attached thereto for a vehicle includes two main surfaces and an end part connecting the two main surfaces, and a resin frame integrally molded to a peripheral edge area of the plate-like body; the resin frame including a main part having a plurality of inner surfaces facing the two main surfaces and the end part, and a plurality of projections obliquely projecting from the main part in a direction opposite to the plate-like body; and the resin frame having no adhesive between the peripheral edge area and an inner surface close to the projections.

15 Claims, 10 Drawing Sheets

(56) References Cited

U.S. PATENT DOCUMENTS

| | | | |
|---|---|---|---|
| 2015/0197143 A1* | 7/2015 | Payne | B62D 25/12 296/76 |
| 2015/0202948 A1* | 7/2015 | Saiki | B60R 13/04 49/502 |
| 2015/0203055 A1* | 7/2015 | Goto | B60R 13/04 52/716.5 |
| 2015/0251524 A1* | 9/2015 | Goto | B60J 5/0426 52/204.71 |
| 2015/0343888 A1* | 12/2015 | Nakamichi | B60J 10/25 296/93 |
| 2018/0134125 A1* | 5/2018 | Takahashi | B60J 10/70 |

* cited by examiner

PLATE-LIKE BODY WITH A RESIN FRAME ATTACHED THERETO FOR A VEHICLE

TECHNICAL FIELD

The present invention relates to a plate-like body with a resin frame attached thereto for a vehicle.

BACKGROUND ART

When a glass plate for a window is mounted into an opening of a vehicle, such as an automobile, it is usual to use a plate-like body with a resin frame attached thereto for a vehicle, wherein a glass plate as the plate-like body has a resin frame attached to a peripheral edge area. The resin frame prevents water, such as rain water, from entering the car-interior side of a vehicle.

As one example of the configuration of a glass plate with a resin frame attached thereto for a vehicle, there has been known a glass plate with a resin frame attached thereto for a vehicle, which has a resin frame integrally molded to a peripheral edge area of the glass plate by injection molding. For example, JP-A-H05-213057 discloses a process for applying an adhesive to the entire peripheral edge area of a glass plate, using a mold with a cavity space to clamp the peripheral edge area of the glass plate with the adhesive applied thereto, and injecting a resin material into the cavity space to produce a glass plate with the resin frame integrally molded thereto.

When the resin frame is molded to the peripheral edge area of the glass plate in the cavity space, the mold is opened to take out the glass plate with the resin frame integrally molded thereto from the mold. Because the configuration of the resin frame has been recently made complicated, the resin frame tends to have a great mold release resistance during demolding when the resin frame has a plurality of portions obliquely projecting into the cavity space for example.

When the mold is opened to demold the resin frame, the resin frame is pulled toward a demolding direction by the mold with the result that the resin frame could detach from an adhesive. When a resin having a low green strength is used to mold the resin frame, the resin frame is likely to detach from an adhesive. When an attempt is made to extend the time for curing the resin material during molding of the resin frame in order to prevent the resin frame from being detached from an adhesive, it causes a reduction in throughput.

DISCLOSURE OF INVENTION

Technical Problem

The present invention is proposed in consideration of these problems. It is an object of the present invention to provide, without causing a reduction in throughput, a plate-like body for a vehicle, to which a resin frame formed in a complicated shape is attached.

According to one aspect of the present invention, there is provided a plate-like body with a resin frame attached thereto for a vehicle, which includes a plate-like body having two main surfaces and an end part connecting the two main surfaces, and a resin frame integrally molded to a peripheral edge area of the plate-like body; the resin frame including a main part having a plurality of inner surfaces facing the two main surfaces and the end part, and a plurality of projections obliquely projecting from the main part in a direction opposite to the plate-like body; and the resin frame having no adhesive between the peripheral edge area and an inner surface close to the projections.

In accordance with the plate-like body with a resin frame attached thereto for a vehicle of the present invention, it is possible to provide, without causing a reduction in throughput, a plate-like body for a vehicle, to which a resin frame formed in a complicated shape is attached.

DESCRIPTION OF EMBODIMENTS

Now, embodiments of the present invention will be described in reference to the accompanying drawings. Although the present invention will be described based on the following embodiments, numerous modifications and changes can be made without departing from the scope of the present invention, and the present invention may be implemented using other embodiments than the embodiments described below. All of the modifications and changes in the scope of the present invention are included in the claims. In the drawings, elements or parts denoted by like references are basically similar elements or parts having similar functions.

(First Embodiment)

Figure 1:
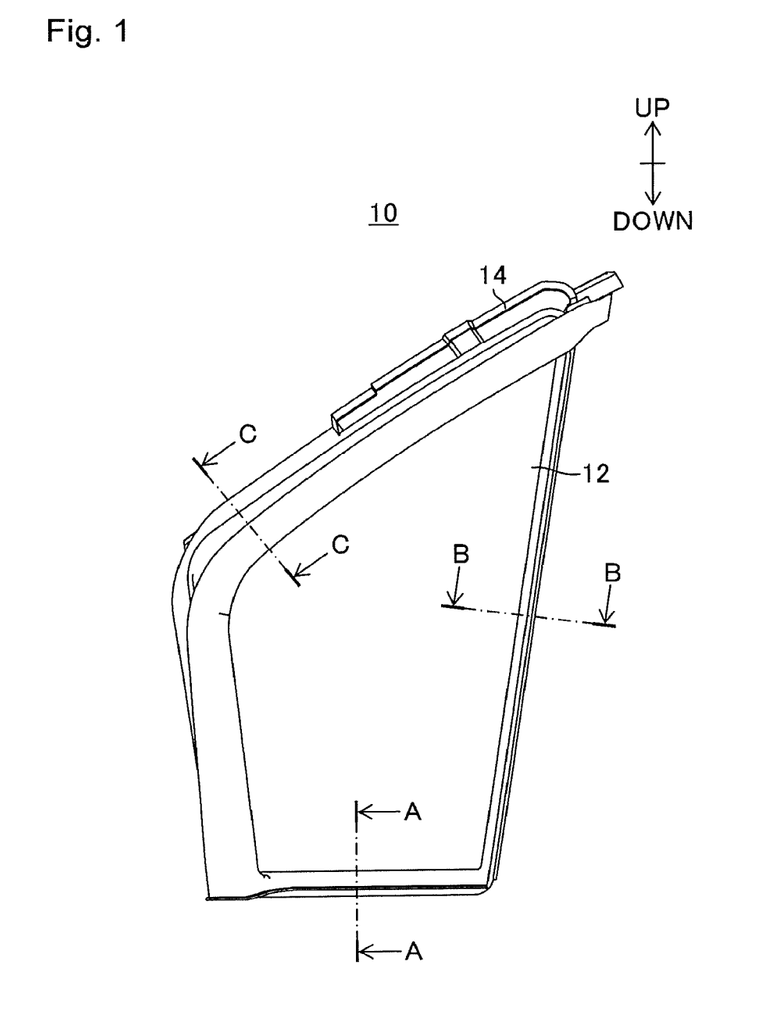
FIG. 1 is a plan view of a plate-like body with a resin frame attached thereto for a vehicle according to the present invention.
Figure 2:
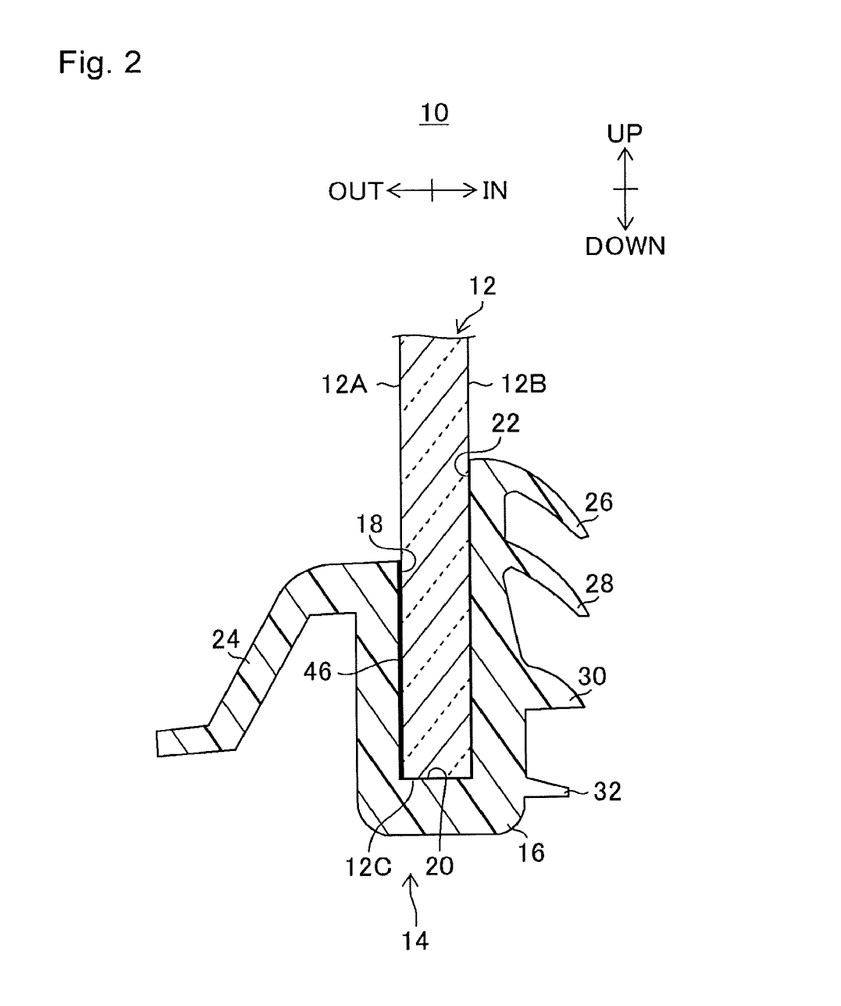
FIG. 2 is cross-sectional view of the first embodiment of the present invention taken along line A-A of FIG. 1.
Figure 3:
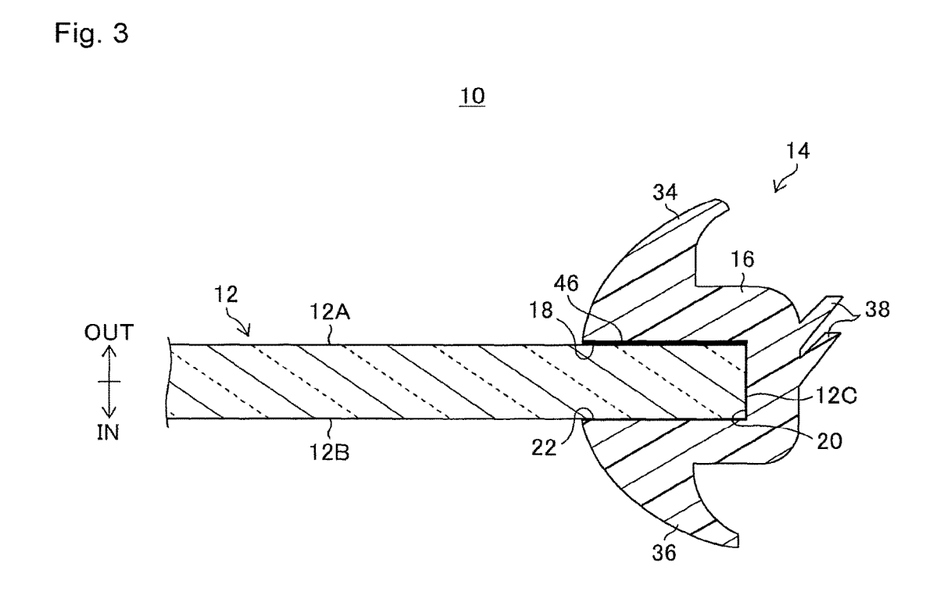
FIG. 3 is cross-sectional view of the first embodiment taken along line B-B of FIG. 1.
Figure 4:
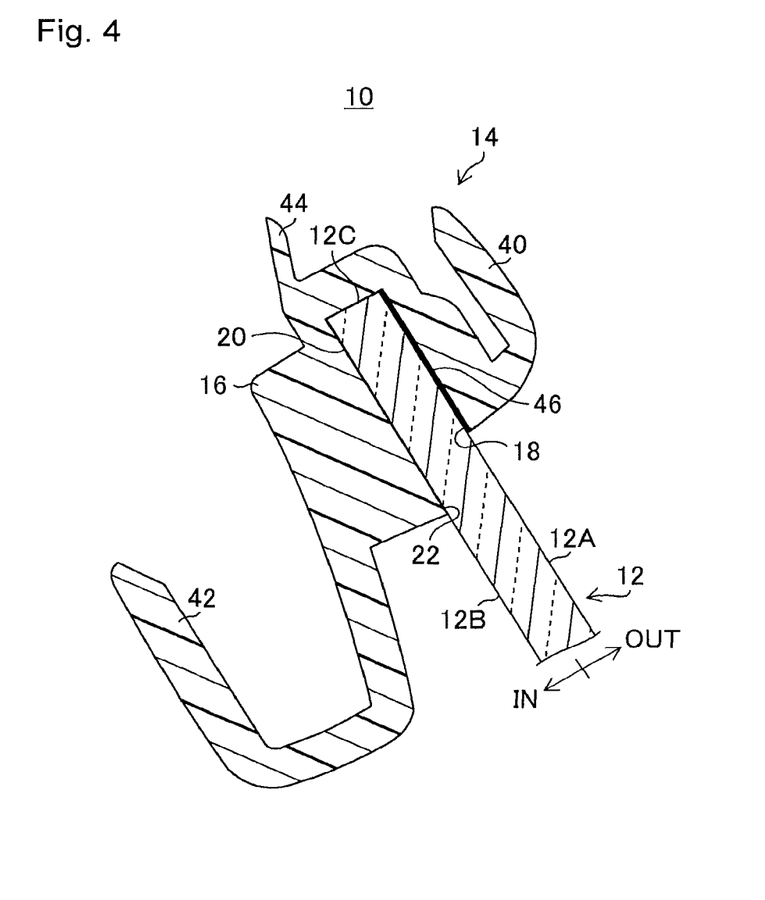
FIG. 4 is cross-sectional view of the first embodiment taken along line C-C of FIG. 1.
Figure 5:
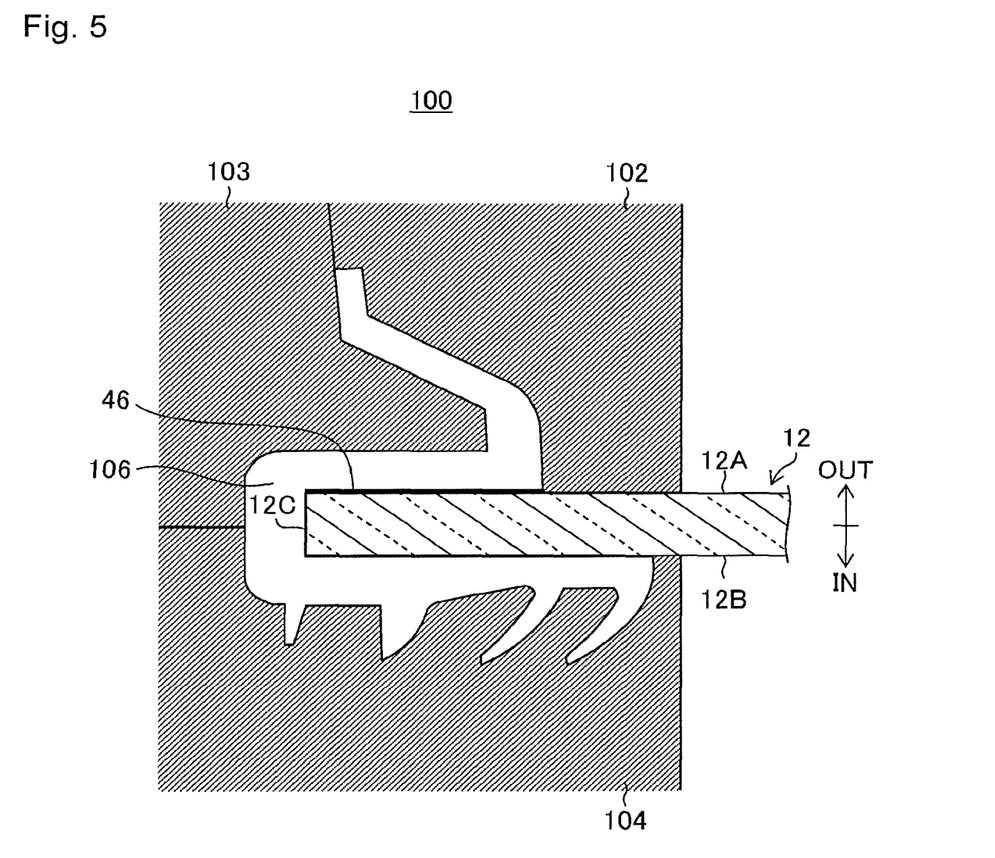
FIG. 5 is a schematic cross-sectional view of essential parts of a mold usable in a device for producing a glass plate with a resin frame attached thereto for a vehicle according to the first embodiment.
Figure 6:
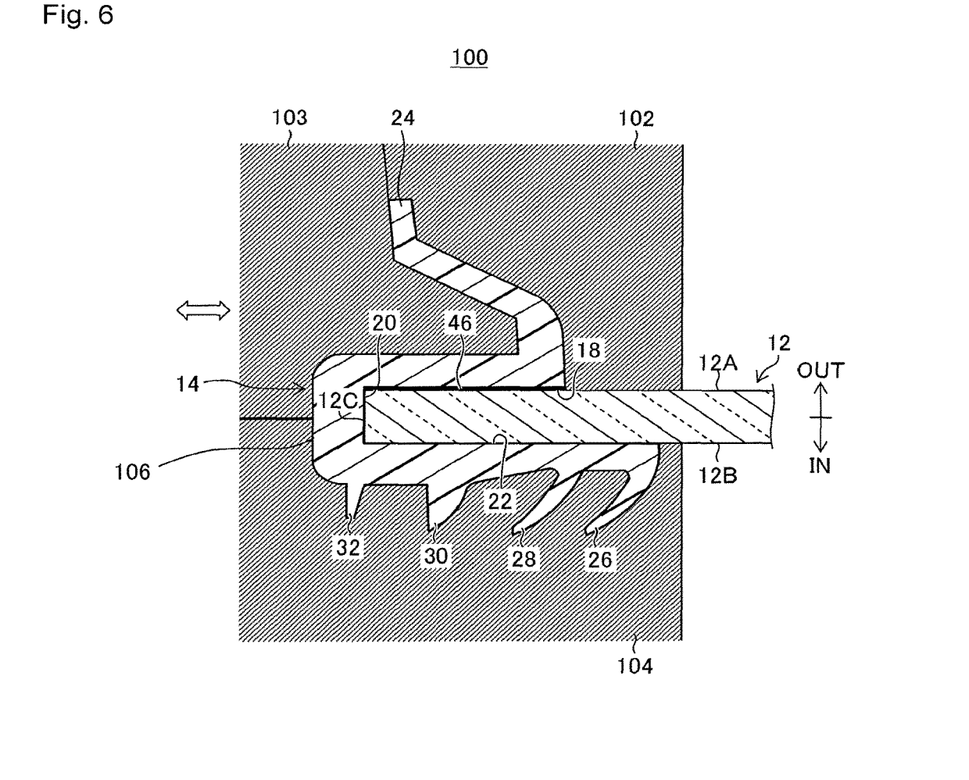
FIG. 6 is a schematic cross-sectional view showing the essential parts of the mold when a resin material has been injected into the mold.

FIG. 1 is a plan view of a plate-like body with a resin frame attached thereto for a vehicle 10 according to the present invention. FIG. 2 is cross-sectional view of the plate-like body according to a first embodiment of the present invention taken along line A-A of FIG. 1, FIG. 3 is cross-sectional view of the plate-like body taken along line B-B of FIG. 1, and FIG. 4 is cross-sectional view of the plate-like body taken along line C-C of FIG. 1. FIG. 5 is a schematic cross-sectional view of essential parts of a mold usable in a device for producing a glass plate with a resin frame attached thereto. FIG. 6 is a schematic cross-sectional view showing the essential parts of the mold when a resin material has been injected into the mold.

The present invention will described about a case where the plate-like body 10 with a resin frame attached thereto for a vehicle is a glass plate. Since the plate-like body is a glass plate, this type of the plate-like body will be called a glass plate with a resin frame attached thereto for a vehicle in the following explanation. In a case where the plate-like body is a synthetic resin plate-like body, explanation of the embodiments are applicable to the case by understanding the embodiments with the glass plate being replaced by a synthetic resin plate-like body.

As shown in FIG. 1, the glass plate with a resin frame attached thereto for a vehicle 10 includes a glass plate 12 formed in a substantially trapezoidal shape as seen in a plan view, and a resin frame 14 attached to a peripheral edge area of the glass plate 12. In these figures, an arrow UP indicates an upward direction in a vertical direction of a vehicle, and an arrow DOWN indicates a downward direction of the vertical direction. An arrow IN indicates a car-interior side of the vehicle, and an arrow OUT indicates a car-exterior side of the vehicle.

As shown in the cross-sectional views of from FIG. 2 to FIG. 4, the glass plate with a resin frame attached thereto for a vehicle 10 includes the glass plate 12 having two opposed main surfaces 12A and 12B, and an end part 12C connecting the two main surfaces 12A and 12B.

The glass plate with a resin frame attached thereto for a vehicle 10 includes the resin frame 14 integrally molded to the peripheral edge area of the glass plate 12. The resin frame 14 has a main part 16 formed with three inner surfaces 18, 20 and 22 facing the two main surfaces 12A and 12B, and the end part 12C. The resin frame 14 is a so-called three-surface molding such that the inner surface 18 of the main part 16 faces the main surface 12A, the inner surface 22 of the main part 16 faces the main surface 12B and the inner surface 20 of the main part 16 faces the end part 12C. In this embodiment, when the glass plate with a resin frame attached thereto for a vehicle 10 is mounted into an opening of a vehicle, the main surface 12A is positioned on a car-exterior side while the main surface 12B is positioned on a car-interior side.

As shown in FIG. 2, the main part 16 of the resin frame 14 has a first projection 24 projecting from a side thereof close to the main surface 12A (car-exterior side). The main part 16 of the resin frame 14 also has second projections 26, 28, 30 and 32 projecting from a side thereof close to the main surface 12B (car-interior side). Thus, the resin frame 14 has the main part 16, and a plurality of projections including the first projection 24 and the second projections 26, 28, 30 and 32.

The first projection 24 and the second projections 26, 28, 30 and 32 are called lips in some cases. When the glass plate with a resin frame attached thereto for a vehicle 10 is mounted into an opening of a vehicle, the first projection 24 is fit into, e.g. a window frame of the vehicle and is elastically deformed by the window frame to close the spacing between the glass plate 12 and the window frame. At that time, the second projections 26, 28, 30 and 32 project toward the car-interior side to close, e.g. the spacing between the glass plate 12 and an interior member.

The first projection 24 is formed to project so as to be curved in a substantially C-character shape as seen in cross-section. The C-character shape as seen in cross-section means that a spacing is formed in an inner concave side, as in e.g. a C-character shape, a substantially C-character shape, a substantially U-character shape or a substantially V-character shape. The second projections 26 and 28 are formed to obliquely projecting in a direction opposite to the glass plate 12 as seen in cross-section. It is usual that the second projections 26 and 28 having such a configuration are formed in a curved shape as a whole or are formed so as to have a bent leading edge. When the second projections 26 and 28 have such a configuration, water, such as rain water, is prevented from running on an outer side of the resin frame 14 to enter the car-interior side. Although it is shown in FIG. 2 that the second projections obliquely projecting in the direction opposite to the glass plate 12 are two projections 26 and 28, the second projections may be more than two. In order to prevent water from running on the car-exterior side of the resin frame 14 from outside and entering the car-interior side in more effectively, it is preferred that the second projections are more than two. The second projection 30 is formed in a substantially fan shape in cross-section while the second projection 32 is formed in a substantially trapezoidal shape in cross-section.

The first projection 24 and the second projections 26, 28, 30 and 32 have different shapes so as to be matched to the configuration of a vehicle window frame, to which the glass plate is mounted. In particular, the second projections 26 and 28 trend to have a greater mold release resistance because of obliquely projecting in the direction opposite to the glass plate 12 in cross-section. This cross sectional shape results in difficulty in releasing the second projections 26 and 28 from a mold 100 (see FIGS. 5 and 6) as described later.

In this embodiment, the glass plate with a resin frame attached thereto for a vehicle 10 has no adhesive applied thereon between the peripheral edge area of the main surface 12B and the inner surface 22 of the main part 16 with the second projections 26, 28, 30 and 32 in order to provide, without causing a reduction in throughput, a plate-like body to which the resin frame 14 formed in a complicated shape is attached.

The main part 16 has the plural inner surfaces 18 and 20 in addition to the inner surface 22 without an adhesive being applied thereto. The main part has an adhesive 26 applied thereon only between the peripheral edge area of the main surface 12A and the inner surface 18 as one of the plural inner surfaces 18 and 20. The main part may have no adhesive applied thereon between the end part 12C and the inner surface 20.

As shown in FIG. 3, the main part 16 has a plurality of projections formed thereon such that the projections include a first projection 34 projecting from a side close to the main surface 12A, a second projection 36 projecting from a side close to the main surface 12B, and third projections 38 projecting from a side close to the end part 12C. The first projection 34 is formed in an arc shape in cross-section. The second projection 36 is also formed in an arc shape in cross-section. The third projections 38 are formed in a substantially rectangular shape in cross-section. As shown in FIG. 3, the main part has no adhesive applied thereon between the inner surface 22 close to the second projection 36 and the peripheral edge area of the main surface 12B. The main part has an adhesive 46 applied thereon only between the inner surface 18 close to the first projection 34 and the peripheral edge area of the main surface 12A.

As shown in FIG. 4, the main part 16 as a plurality of projections formed thereon such that the projections include a first projection 40 projecting from a side close to a main surface 12A, a second projection 42 projecting from a side close to the main surface 12B and a third projection 44 projecting from a side close to the end part 12C. As shown in FIG. 4, the main part has no adhesive applied thereon between the inner surface 22 close to a second projection 42 and the peripheral edge area of the main surface 12B. The main part has the adhesive 46 applied thereon only between the inner surface 18 close to the first projection 40 and the peripheral edge area of the main surface 12A.

The first projection 40 is formed in a substantially C character shape in cross-section, and the second projection 42 is also formed in a substantially C character shape in cross-section.

The second projections 26, 28, 30, 32, 36 and 42 project towards the car-interior side. For this reason, the inner surface 22 of the main part 16 close to the second projections 26, 28, 30, 32, 36 and 42 is visible from the car-exterior side in some cases. Suppose that an adhesive is applied between the inner surface 22 and the peripheral edge area of the main surface 12B, if the resin frame 14 is partly detached from the adhesive, a detached part and a non-detached part are recognized as an unintentional pattern, which is not preferred in terms of appearance.

In this embodiment, no adhesive is between the inner surface 22 and the peripheral edge area of the main surface 12B, resulting in no problem in appearance caused by detachment of the resin frame 14 from an adhesive. Even when the resin frame 14 is formed in a complicated shape, there is no reduction in throughput.

Although it is shown that the glass plate 12 is formed in a substantially trapezoidal shape as seen in a plan view, there is no limitation to the shape. The glass plate 12 may be flat or curved. The plate-like body may be in the form of laminated glass, tempered glass and a double-glazed unit in addition to a glass plate as a single plate. The plate-like body may be a plate-like body made of a synthetic resin, or a laminated plate with a plate-like body made of a synthetic resin and a glass plate combined therein. A plate-like body made of a transparent organic resin material, such as polycarbonate, polystyrene, or poly-methylmethacrelate, or a laminate having at least two sheets made of at least one of these resins is applicable to the plate-like body made of a synthetic resin. Examples of the vehicle include an automobile and an electric railway car. With regard to the automobile, such a plate-like body is applicable to a window for a vehicle, such as a rear window, a windshield, a roof window, a sidelite, a side door window, an opera window, a rear quarter window, or a front bench window.

The resin frame 14 collectively means a gasket, a molding, a weather strip, a seal rubber and so on attached around a plate-like body. As the resin material for forming the resin frame, soft polyvinyl chloride is generally used. An elastomer, such as a polyolefin-based elastomer, a polyurethane-based elastomer, a polyester-based elastomer or a polyimide-based elastomer, polyurethane, an ethylene-vinyl acetate copolymer, vinyl acetate, chlorinated polyethylene, ethylene-propylene-diene-terpolymer (EPDM) and other rubber material may be used. As needed, a mixture of at least two kinds of these materials may be used.

The adhesive 46 may be a mixture of at least one or more selected from a polyurethane-based adhesive, a polyester-based adhesive, a polyamide-based adhesive, a phenol-based adhesive, an acrylic adhesive, an epoxy-based adhesive, a cyanoacrylate-based adhesive, a rubber-based adhesive and so on. The adhesive may be used as it is, or used, being dissolved in a solvent. The adhesive may be used as in an emulsion state to be dispersed in water.

Although it is shown in FIG. 1 that the resin frame 14 is mounted to the entire peripheral edge area of the glass plate 12, the resin frame may be mounted to the peripheral edge area so as to be discontinuous. Although the resin frame 14 has different cross-sectional shapes at the respective sides of the glass plate 12 in this embodiment as shown in FIG. 2 to FIG. 4, the resin frame 14 may have the same cross-sectional shape as one another at all sides of the glass plate. The peripheral edge area of the glass plate 12 means an area that ranges from the end part 12C of the glass plate 12 to a position apart therefrom by a certain distance.

Now, a device for producing the glass plate with a resin frame attached thereto for a vehicle 10 according to the present invention, and a method for producing the glass plate will be described.

FIG. 5 is a schematic cross-sectional view of essential parts of the mold 100 as a device for producing the glass plate with a resin frame attached thereto for a vehicle 10. The mold 100 includes dies 102 and 103 as top dies, and a die 104 as a bottom die. The space defined by these dies 102, 103 and 104 forms a cavity space 106.

Now, a method for producing the glass plate with a resin frame attached thereto for a vehicle 10 by use of the mold 100 will be explained in a case where the plate-like body is a glass plate.

First, as shown in FIG. 5, the glass plate 12 is sandwiched between the die 102 and the die 104 at the peripheral edge area such that the cavity space 106 is formed between the dies 102 and 103, the die 104 and the peripheral edge area of the glass plate 12. The adhesive 46 is not applied on the main surface 12B of the glass plate 12 which is close to the second projections 26 and 28 obliquely projecting in a direction opposite to the glass plate 12 from the main part 16 (see FIG. 2). The adhesive 46 is applied only on a part of the peripheral edge area of the main surface 12A of the glass plate 12 close to the first projection 24.

As shown in FIG. 6, the resin material is injected in a molten state into the cavity space 106 from an injection port (not shown) to be filled in the cavity space 106. The mold 100 is held under a certain pressure until the resin material is cured after the resin material is injected into the cavity space 106 of the mold 100.

Then, the mold 100 is opened, and the dies 102 and 103 and the die 104 are moved in a demolding direction. The first projections 24 extends toward the dies 102 and 103, being formed in a substantially C-shape in cross-section. The die 103 is configured so as to be slidable forward and backward directions as shown by an arrow. For this reason, when the first projection 24 is released from the mold 100, the resin frame is subjected to a low mold-releasing resistance. The backward movement means a movement in a direction to be apart from the resin frame 14. When the dies 102 and 103 are moved, the first projection 24 is hardly pulled. Thus, the inner surface 18 of the main part 16 is not detached from the adhesive 46 with the result that the resin frame 14 is not detached from the adhesive 46.

On the other hand, the second projections 26 and 28 obliquely project from the main part 16 toward the die 104 in a direction opposite to the glass plate 12. It is difficult to use a slidable mold for the second projections 26 and 28 having such a configuration. In many cases, the second projections 26 and 28 having such a configuration are entirely curved or have a bent leading end in order to water, such as rain water, from running on the car-exterior side of the resin frame 14 to enter the car-interior side. Even in a case where the die 104 is obliquely slid, leading edges of the second projections 26 and 28 generate mold-releasing resistance. With the movement of the die 104, the presence of such mold releasing resistance causes the second projections 26 and 28 to be pulled by the die 104, with the result that the main part 16 is deformed in a direction to be apart from the main surface 12B of the glass plate 12. Even when the second projections 26 and 28 are deformed, there is, however, no problem of detachment of the resin frame 14 from the adhesive 46 since no adhesive 46 is disposed between the main surface 12B and the inner surface 22 of the main part 16.

When the second projections 26 and 28 are released from the die 104, the resin frame 14 causes the main part 16 to elastically return to a position to be brought into contact with the main surface 12B of the glass plate 12.

Even when the resin material has a low green strength, it is possible to provide, without a reduction in throughput, a plate-like body with a resin frame attached thereto for a vehicle having a complicated shape since it is not necessary to extend the time for curing the resin used for molding the resin frame 14.

In this embodiment, the adhesive 46 is disposed between the inner surface 18 of the main part 16 of the resin frame 14 and the peripheral edge area of the main surface 12A of the glass plate 12. The presence of the adhesive 46 prevents water, such as rain water, from entering from the car-exterior side into the car-interior side. It is preferred that the adhesive 46 be disposed between the inner surface 18 of the main part 16 and a part of the peripheral edge area of the main surface 12A facing the car-exterior side. It is because rain water or other water enters from the car-exterior side.

(Second Embodiment)

The plate-like body with a resin frame attached thereto for a vehicle according to a second embodiment of the present invention will be described in reference to FIGS. 7 to 10. Similar elements to the elements of the plate-like body with a resin frame attached thereto for a vehicle according to the first embodiment will be denoted by similar reference numerals, and explanation on these elements will be omitted in some cases.

Figure 7:
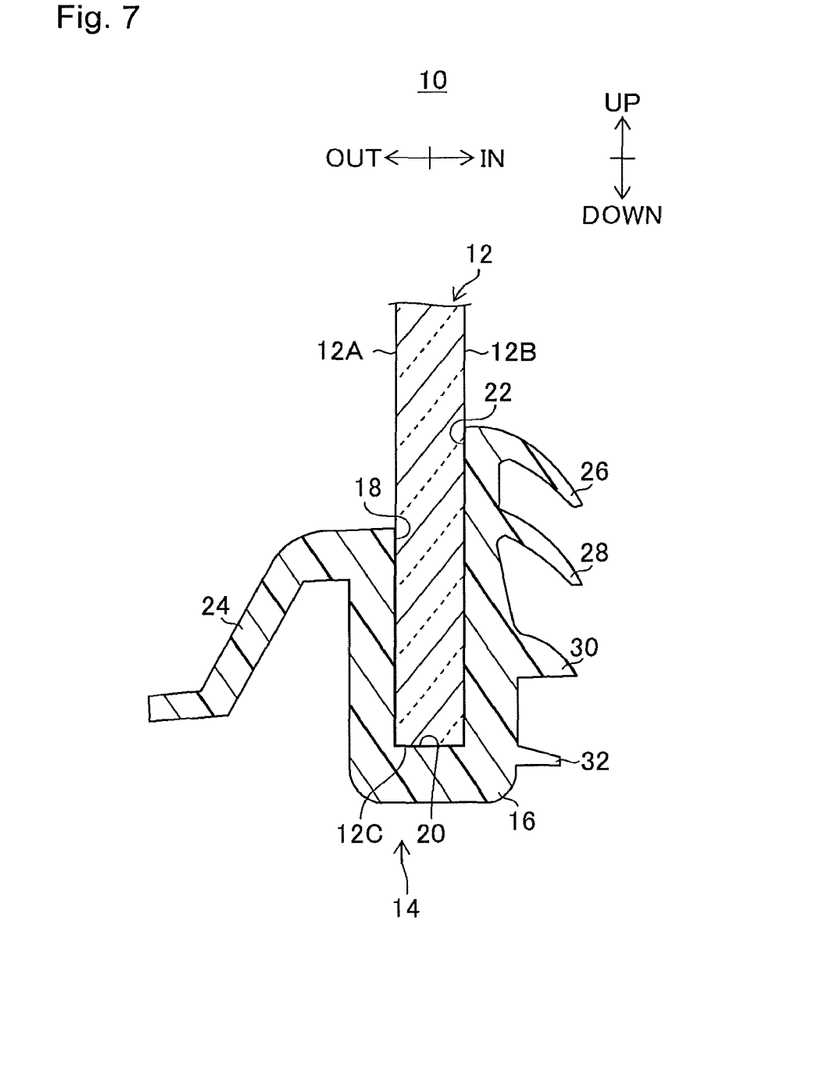
FIG. 7 is cross-sectional view of the plate-like body with a resin frame attached thereto for a vehicle according to a second embodiment of the present invention taken along line A-A of FIG. 1.

The resin frame 14 according to the second embodiment is formed in a similar shape in cross-section to the shape of the first embodiment shown in FIGS. 2 to 4. The resin frame 14 according to the second embodiment has no adhesive disposed between the inner surface 22 of the resin frame 14 and the peripheral edge area of the main surface 12B as in the first embodiment. The second embodiment is different from the first embodiment in that no adhesive is disposed between the inner surface 18 and the main surface 12A and between the inner surface 20 and the end part 12C as shown in FIG. 7. In the second embodiment, even when a glass plate with a resin frame attached thereto for a vehicle 12 is fit into a window frame of a vehicle to elastically deform a first projection 24 to generate a stress to pull the resin frame 14 toward a car-exterior side when the glass plate is mounted to an opening of the vehicle, there is no problem in appearance caused by detachment of the resin frame 14 from an adhesive since no adhesive is disposed between the inner surfaces 18, 20 and 22 of the main part 16 and the main surfaces 12A and 12B and edge part 12 C of the glass plate 12.

Now, a device for producing the glass plate with a resin frame attached thereto for a vehicle 10 according to the second embodiment and a method for producing the glass plate will be described in terms of references form the first embodiment.

Figure 8:
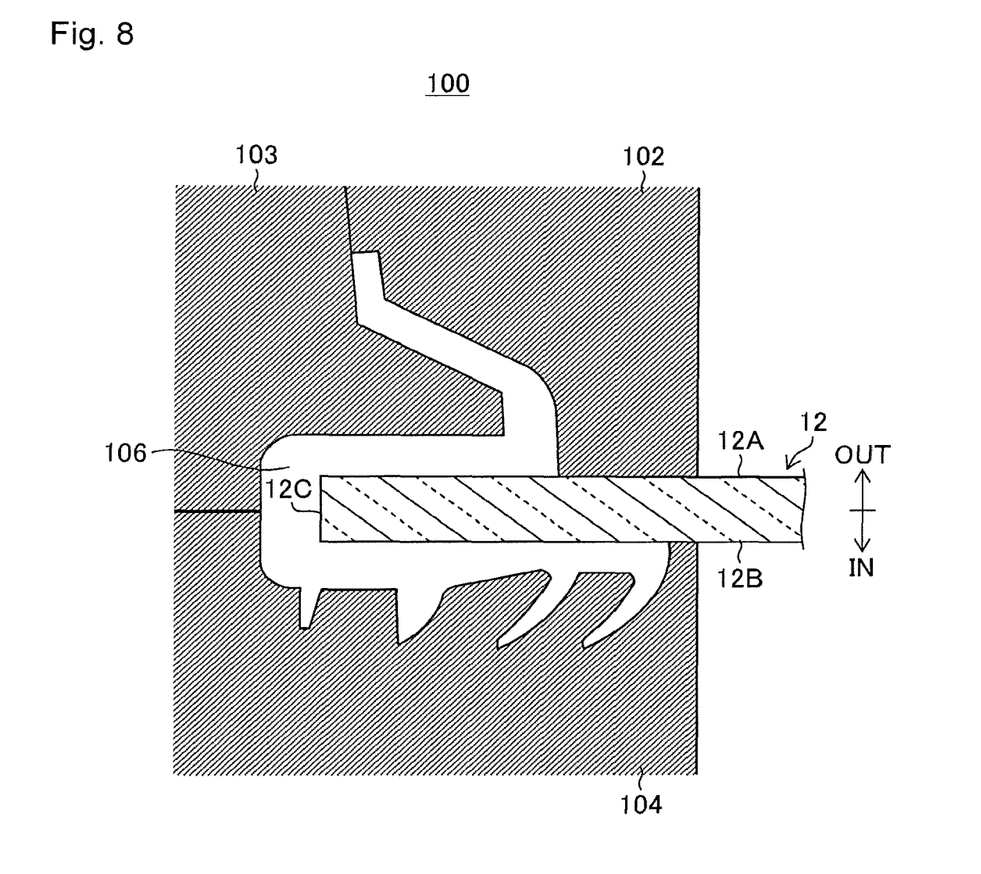
FIG. 8 is a schematic cross-sectional view of essential parts of a mold usable in a device for producing a glass plate with a resin frame attached thereto for a vehicle according to the second embodiment.

As shown in FIG. 8, the second embodiment is carried out such that the glass plate 12 has a peripheral edge area sandwiched between a die 102 and the die 104 as in the first embodiment. Between the die 102, a die 103, the die 104 and the peripheral edge area of the glass plate 12, a cavity space 106 is formed. On the other hand, the second embodiment is carried out such that no adhesive is applied on the peripheral edge area of the glass plate 12, which is different from the first embodiment. For this reason, it is possible to have further improved throughput in comparison with the first embodiment since there is no step of applying an adhesive.

Figure 9:
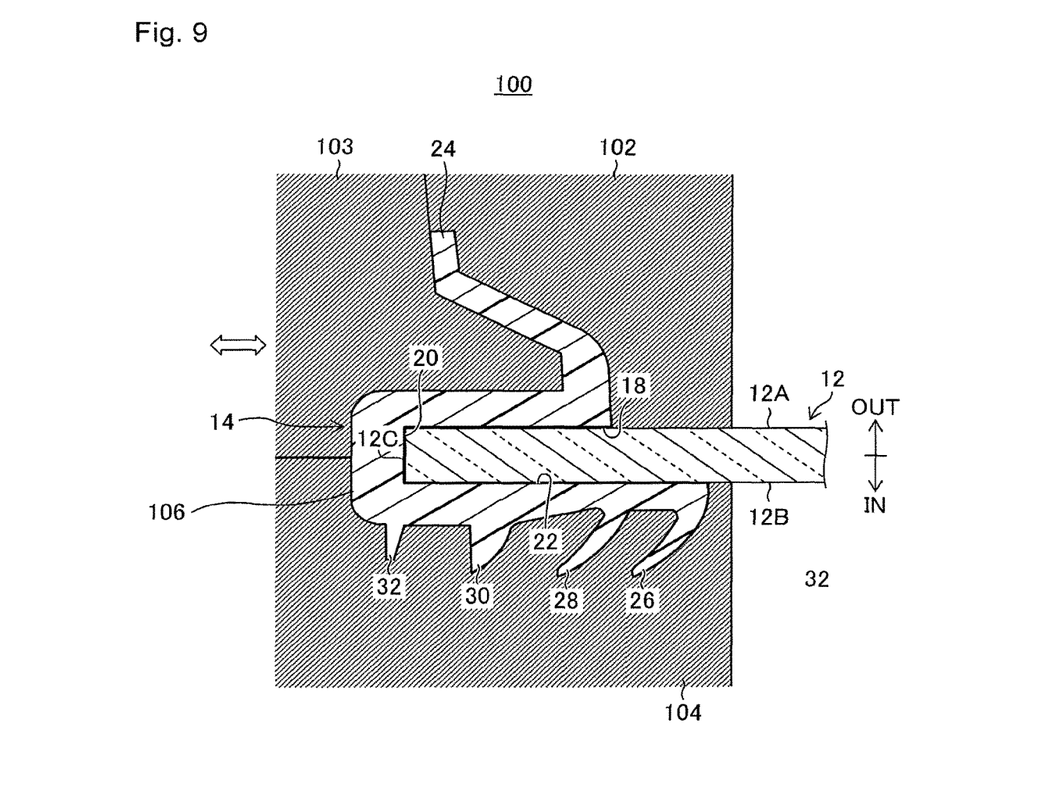
FIG. 9 is a schematic cross-sectional view showing the essential parts of the mold when a resin material has been injected into the mold.

Then, as shown in FIG. 9, a resin material is injected in a molten state into the cavity space 106 from an injection port (not shown) to be filled in the cavity space 106. A mold 100 molding the dies 102, 103 and 104 is held under a certain pressure until the resin material is cured after the resin material is injected into the cavity space 106 of the mold 100. After that, the mold 100 is opened to release the glass plate with a resin frame attached thereto for a vehicle 10 from the mold 100 as in the first embodiment.

Figure 10:
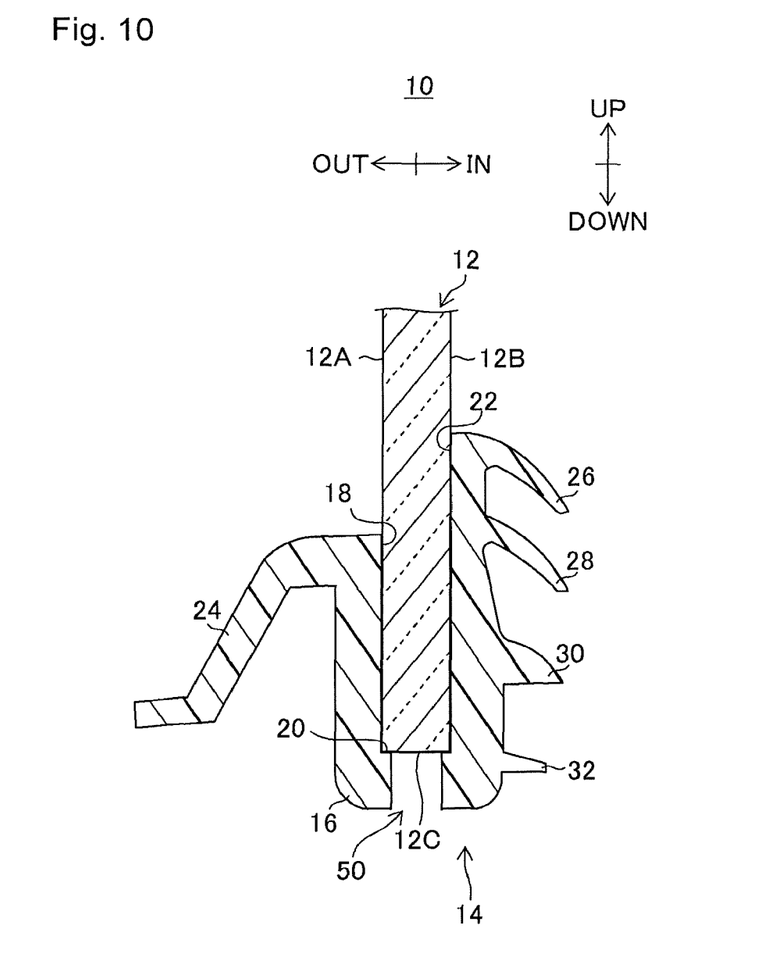
FIG. 10 is cross-sectional view of the resin frame with a drain hole according to the second embodiment.

In the second embodiment, no adhesive is disposed between the resin frame 14 and the glass plate 12. For this reason, it is possible that e.g. water enters from the main surface 12A on the car-exterior side into the main surface 12B on the car-interior side. From this point of view, it is preferred that the resin frame 14 have a drain hole 50 formed therein to discharge such fluid outside. For example, it is preferred that the drain hole 50 be disposed at at least one location in the inner surface 20 of a part of the main body 16 situated at a lower position as shown in FIG. 10 when the glass plate with a resin frame attached thereto for a vehicle 10 is mounted to an opening of a vehicle. Thus, water entering between the main surface 12A and the inner surface 18 of the resin frame 14 is drained through the drain hole 50 such that the glass plate with a resin frame attached thereto for a vehicle 10 can be securely provided with a draining function.

There is no limitation to the shape, the dimensions and so on of the drain hole 50 so long as the drain hole is securely provided with the draining function. For example, the drain hole 50 may include a plurality of cylindrical holes or an elongated continuous hole. The location of the drain hole 50 in the resin frame 14 may be properly determined, depending on the shape of the glass plate 12 of the glass plate with a resin frame attached thereto for a vehicle 10. The drain hole 50 may be disposed at any location in the resin frame 14 so long as the drain hole 50 has an opening close to the glass plate 12 situated at a higher position than the opening remote from the glass plate 12.

The entire disclosure of Japanese Patent Application No. 2016-224118 filed on Nov. 17, 2016 including specification, claims, drawings and summary is incorporated herein by reference in its entirety.

What is claimed is:

1. A resin-frame-attached plate for a vehicle, comprising:
   a plate having two main surfaces and an end part connecting the two main surfaces;
   a resin frame integrally molded to a peripheral edge area of the plate; and
   an adhesive disposed between the plate and the resin frame,
   wherein:
   one of the two main surfaces is a car-exterior side surface which is positioned at a car-exterior side when the plate is mounted to an opening of a vehicle;
   the resin frame comprises:
      a main part having a plurality of inner surfaces facing the two main surfaces and the end part; and
      a plurality of projections obliquely projecting from the main part in a direction opposite to the plate; and
   the adhesive is disposed only between the peripheral edge area of the car-exterior side surface and the inner surface of the resin frame which faces the peripheral edge area of the car-exterior side surface.

2. The resin-frame-attached plate according to claim 1, wherein each of the projections is curved as a whole or has a bent leading edge.

3. The resin-frame-attached plate according to claim 1, wherein at least two of the projections project toward a car-interior side when the plate is mounted to an opening of a vehicle.

4. The resin-frame-attached plate according to claim 1, further comprising a drain hole formed in the resin frame to drain out water entering the resin frame when the plate is mounted to the opening of the vehicle.

5. The resin-frame-attached plate according to claim 1, wherein the adhesives is at least one selected from the group consisting of a polyurethane-based adhesive, a polyester-based adhesive, a polyamide-based adhesive, a phenol-based adhesive, an acrylic adhesive, an epoxy-based adhesive, a cyanoacrylate-based adhesive, and a rubber-based adhesive.

6. The resin-frame-attached plate according to claim 1, wherein at least two of the projections project toward a car-interior side and only one projection projects toward the car-exterior side, when the plate is mounted to the opening of the vehicle.

7. The resin-frame-attached plate according to claim 2, wherein the adhesives is at least one selected from the group consisting of a polyurethane-based adhesive, a polyester-based adhesive, a polyamide-based adhesive, a phenol-based adhesive, an acrylic adhesive, an epoxy-based adhesive, a cyanoacrylate-based adhesive, and a rubber-based adhesive.

8. The resin-frame-attached plate according to claim 2, wherein at least two of the projections project toward a car-interior side and only one projection projects toward the car-exterior side, when the plate is mounted to the opening of the vehicle.

9. The method of producing a resin-frame-attached plate for a vehicle, the method comprising:
   applying an adhesive only to a peripheral edge area of a car-exterior side surface of a plate, the car-exterior side surface being one of two main surfaces of the plate which is positioned at a car-exterior side when the plate is mounted to an opening of the vehicle; and
   molding a resin to the peripheral edge area of the plate to form a resin frame integrally molded to the peripheral edge area of the plate,
   wherein the resin frame comprises:
      a main part having a plurality of inner surfaces facing the two main surfaces and an end part connecting the two main surfaces of the plate; and
      a plurality of projections obliquely projecting from the main part in a direction opposite to the plate.

10. The method according to claim 9, wherein each of the projections is curved as a whole or has a bent leading edge.

11. The method according to claim 9, wherein at least two of the projections project toward a car-interior side when the plate is mounted to the opening of the vehicle.

12. The method according to claim 9, wherein the resin frame further comprises a drain hole formed in the resin frame to drain out water entering the resin frame when the plate is mounted to the opening of the vehicle.

13. The method according to claim 9, wherein the adhesives is at least one selected from the group consisting of a polyurethane-based adhesive, a polyester-based adhesive, a polyamide-based adhesive, a phenol-based adhesive, an acrylic adhesive, an epoxy-based adhesive, a cyanoacrylate-based adhesive, and a rubber-based adhesive.

14. The method according to claim 9, wherein the adhesive is applied as a solution or an emulsion of the adhesive.

15. The method according to claim 9, wherein at least two of the projections project toward a car-interior side and only one projection projects toward the car-exterior side, when the plate is mounted to the opening of the vehicle.

* * * * *